(12) United States Patent
Chen (10) Patent No.: US 7,746,518 B2
(45) Date of Patent: Jun. 29, 2010

(54) AREA IMAGE ACQUIRING METHOD FOR IMAGE READING APPARATUS

(75) Inventor: Yen-Cheng Chen, Hsinchu (TW)

(73) Assignee: Avision Inc. (TW)

( * ) Notice: Subject to any disclaimer, the term of this patent is extended or adjusted under 35 U.S.C. 154(b) by 825 days.

(21) Appl. No.: 11/698,731

(22) Filed: Jan. 26, 2007

(65) Prior Publication Data

US 2007/0171487 A1 Jul. 26, 2007

(30) Foreign Application Priority Data

Jan. 26, 2006 (TW) ............................. 95102997 A (51) Int. Cl.
*H04N 1/04* (2006.01)
*H04N 1/40* (2006.01)
*H04N 1/393* (2006.01)
*G01T 1/164* (2006.01)
*G01N 21/86* (2006.01)

(52) U.S. Cl. ...................... 358/474; 358/449; 358/451; 250/363.02; 250/559.04

(58) Field of Classification Search ................. 358/474, 358/449, 451, 496, 443; 378/57, 58, 62, 378/64, 170, 145, 153, 160; 250/492.3, 358.1, 250/505.1, 363.02, 559.04, 559.05, 559.06, 250/559.07, 559.08
See application file for complete search history.

(56) References Cited

U.S. PATENT DOCUMENTS

| 5,057,943 | A  | * | 10/1991 | Takahashi ................. 358/496 |
| 5,119,211 | A  | * | 6/1992 | Sakurai ..................... 358/464 |
| 7,492,861 | B2 | * | 2/2009 | Chen et al. .................. 378/57 |
| 2005/0169421 | A1 | * | 8/2005 | Muenchau et al. ............ 378/57 |
| 2008/0089476 | A1 | * | 4/2008 | Chen et al. .................. 378/57 |
| 2008/0226273 | A1 | * | 9/2008 | Kaku ............................ 396/3 |

* cited by examiner

*Primary Examiner*—Jerome Grant, II (57) ABSTRACT

An image acquiring method of a scanned image is applying to an image reading apparatus having an automatic sheet-feeding function. The method includes the steps of: acquiring a first image at a scan region of the image reading apparatus by performing a sheet-feeding operation and an image reading operation; analyzing the first image to recognize an effective area and an ineffective area outside the effective area; and adjusting a timing for starting acquiring a second image in relation to size of the ineffective area, so as to reduce the size of the ineffective area in the second image.

18 Claims, 8 Drawing Sheets

AREA IMAGE ACQUIRING METHOD FOR IMAGE READING APPARATUS

BACKGROUND OF THE INVENTION

1. Field of the Invention

The invention is in general related to an image acquiring method, and more particularly to an area image acquiring method of generating a precise area image of a sheet in an image reading device.

2. Prior Art

Figure 1A:
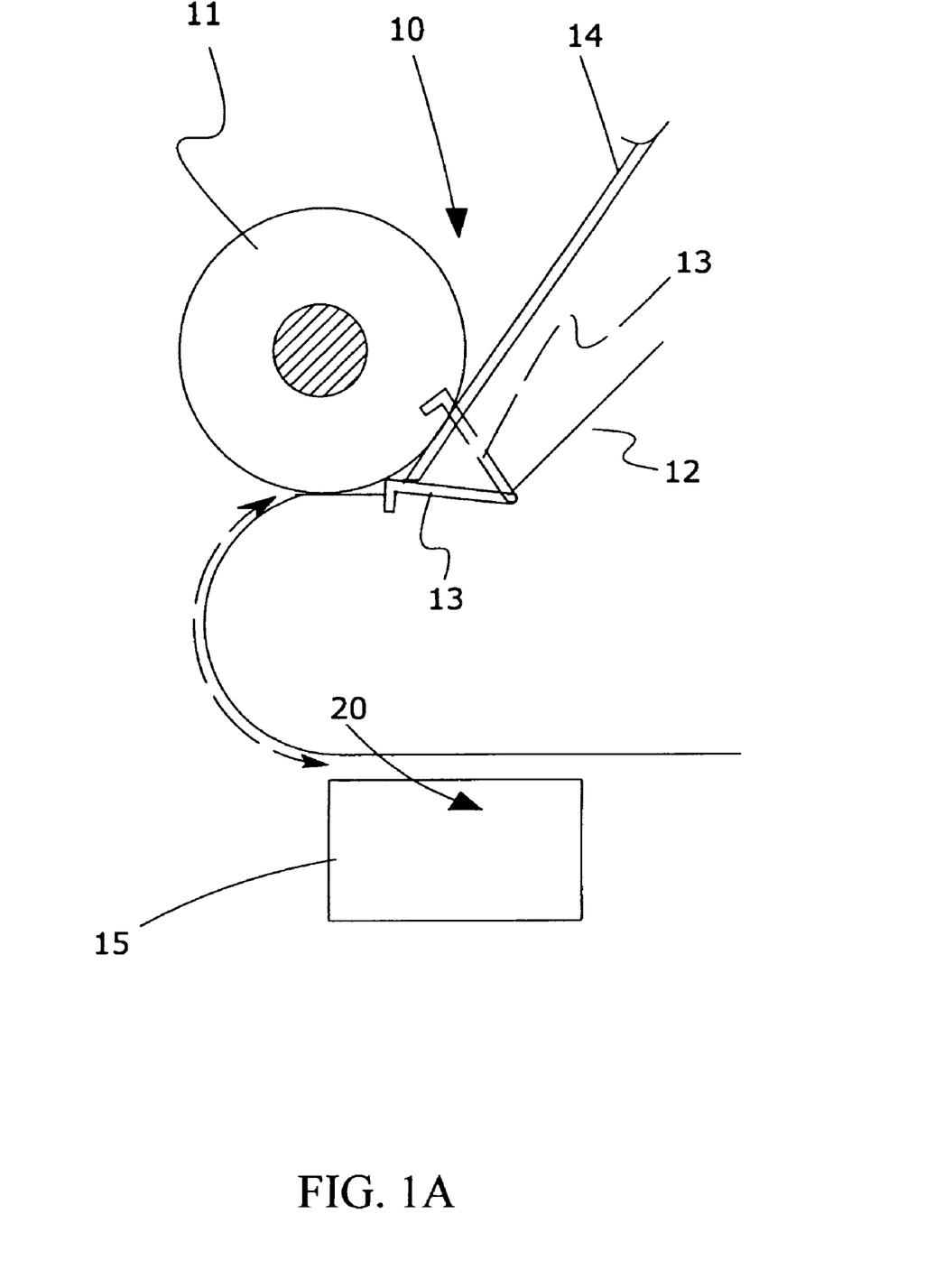
FIG. 1A is a schematic illustration showing an image reading apparatus according to the prior art.

Image reading devices, such as a sheet-fed scanner, a combination of a sheet feeder and a flatbed scanner, a multi-function peripheral, a copier and the like, having the sheet-feeding functions, use similar sheet-feeding and image reading methods. As shown in FIG. 1A, for example, an image reading apparatus 10 is composed of a sheet feeder and a flatbed scanner. The sheet feeder includes a feeding roller 11, a paper tray 12 and a switch 13. The switch 13 triggers an optical sensor to send a signal to a control unit of the image reading apparatus 10. When a sheet 14 is placed on the paper tray 12, the sheet 14 actuates the switch 13 and thus the image reading apparatus 10 obtains the information that the sheet 14 is in a position to be transported by the feeding roller 11. The feeding roller 11 rotates and moves the sheet 14 towards the position opposite a scanning module 15.

Because the feeding roller 11 and the scanning module 15 are separated by a distance, as indicated by a dashed line arrow, the scanning module 15 cannot acquire an image until the sheet 14 is moved by the distance. Usually, the path length is known, and it is possible to calculate and control in advance when for the scanning module 15 to start acquiring the image.

However, because the optical sensor is controlled by the mechanical switch 13, a mechanical tolerance $\Delta d1$ between the switch 13 and the optical sensor exists. Also, the feeding roller 11 tends to be worn, resulting in an outer diameter error $\Delta d2$ which increases with the using time.

Figure 1B:
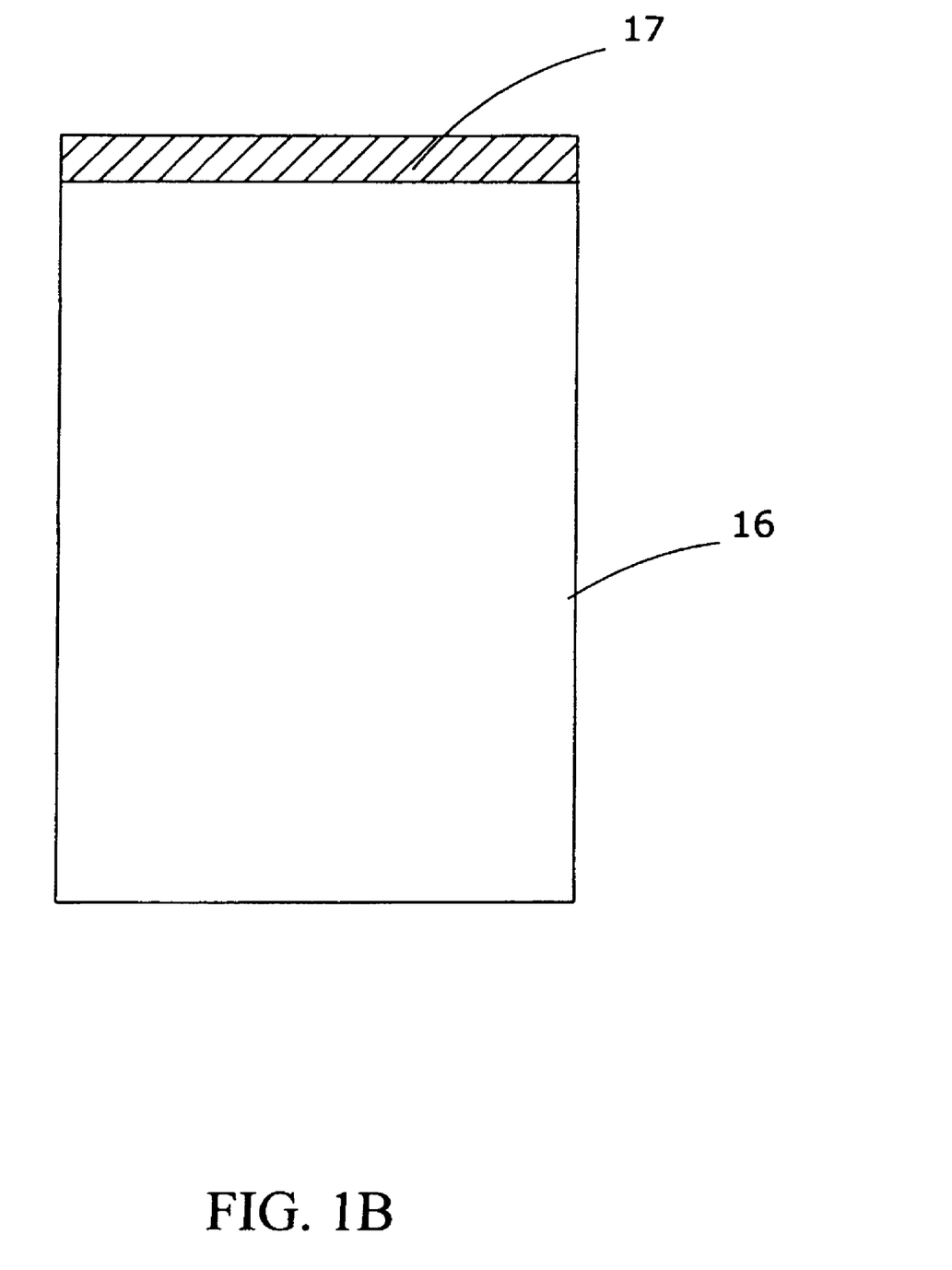
FIG. 1B is a schematic illustration showing a scanned image according to the prior art.

When the sheet 14 reaches the position opposite the scanning module 15, the travel error equals to ($\Delta d1 \square \Delta d2$), which is about 3 to 4 mm in length. In other words, as shown in FIG. 1B, an image 16 contains an obvious leading edge error 17.

The outer diameter error ($\Delta d2$) can be reduced by replacing the feeding roller 11, but the mechanical tolerance ($\Delta d1$) between the switch 13 and the optical sensor cannot be overcome. In addition, the outer diameter error ($\Delta d2$) of the feeding roller becomes greater with the using time.

SUMMARY OF THE INVENTION

The present invention provides an area image acquiring method of automatically determining an area image and the front boundary of the area image in a scanned image for an image reading apparatus.

The method of the present invention can precisely position the front boundary and the area image. In addition, the method of the present invention solves the problem, caused by the element wear, of the image reading apparatus not transporting the sheet to the predetermined scan position.

Thus, the present invention provides an area image acquiring method for an image reading apparatus having an automatic sheet-feeding function. The method includes the steps of: acquiring a first image at a scan region by performing a sheet-feeding operation and an image reading operation; analyzing the first image to recognize an effective area and an ineffective area outside the effective area; and adjusting timing for starting acquiring a second image in relation to size of the ineffective area, so as to reduce the size of the ineffective area in the second image.

More specifically, the present invention provides a method to position an area image and the front boundary of the area image in a scanned image by changing a travel distance of the sheet transported before the sheet is scanned in conjunction with changing a scanning timing of a scanning module of the image reading apparatus so that the scanned image matches with the image of the sheet or of an area of the sheet.

DETAILED DESCRIPTION OF THE PREFERRED EMBODIMENT OF THE INVENTION

The method of the invention is adopted in an image reading apparatus. The apparatus includes a sheet feeding device/mechanism and a scanning device. Thus, the apparatus may be a sheet-fed scanner, a flatbed scanner with a document feeder, a multi-function peripheral, or a copy machine.

As mentioned in the prior art, the sheet feeding device of the apparatus includes at least one feeding roller for transporting a sheet placed in a paper tray towards a scanning module. The distance traveled by the sheet from paper tray towards the scanning module is preset in accordance with a predetermined number of rotations of the feeding roller. If the feeding roller is worn or stained, in this case, the feeding roller moves the sheet by a lengthened or shortened distance, thereby causing the incorrect timing of scanning the sheet and the front boundary of the scanned image not corresponding to the leading edge of the sheet. The method of the invention can be adopted to position the front boundary.

In this invention, when the sheet contacts the feeding roller, the scanning module is ready for scanning the sheet, and the scanning module can be initiated to start scanning the sheet once the sheet starts moving.

Before the sheet reaches the position corresponding to the scanning module, the image scanned and acquired by the scanning module is the image of a backing part disposed on the image reading apparatus, which provides a background reference for the sheet. Usually, the color of the backing part is white or black.

When the sheet is transported to the position corresponding to the scanning module, the scanning module starts to acquire the image of the sheet. Because the sheet and the background reference have different reflectivities or colors, when the scanning module finish reading the sheet, the image of the sheet and the image of the background in the scanned image will have different gray or color levels.

Figure 2:
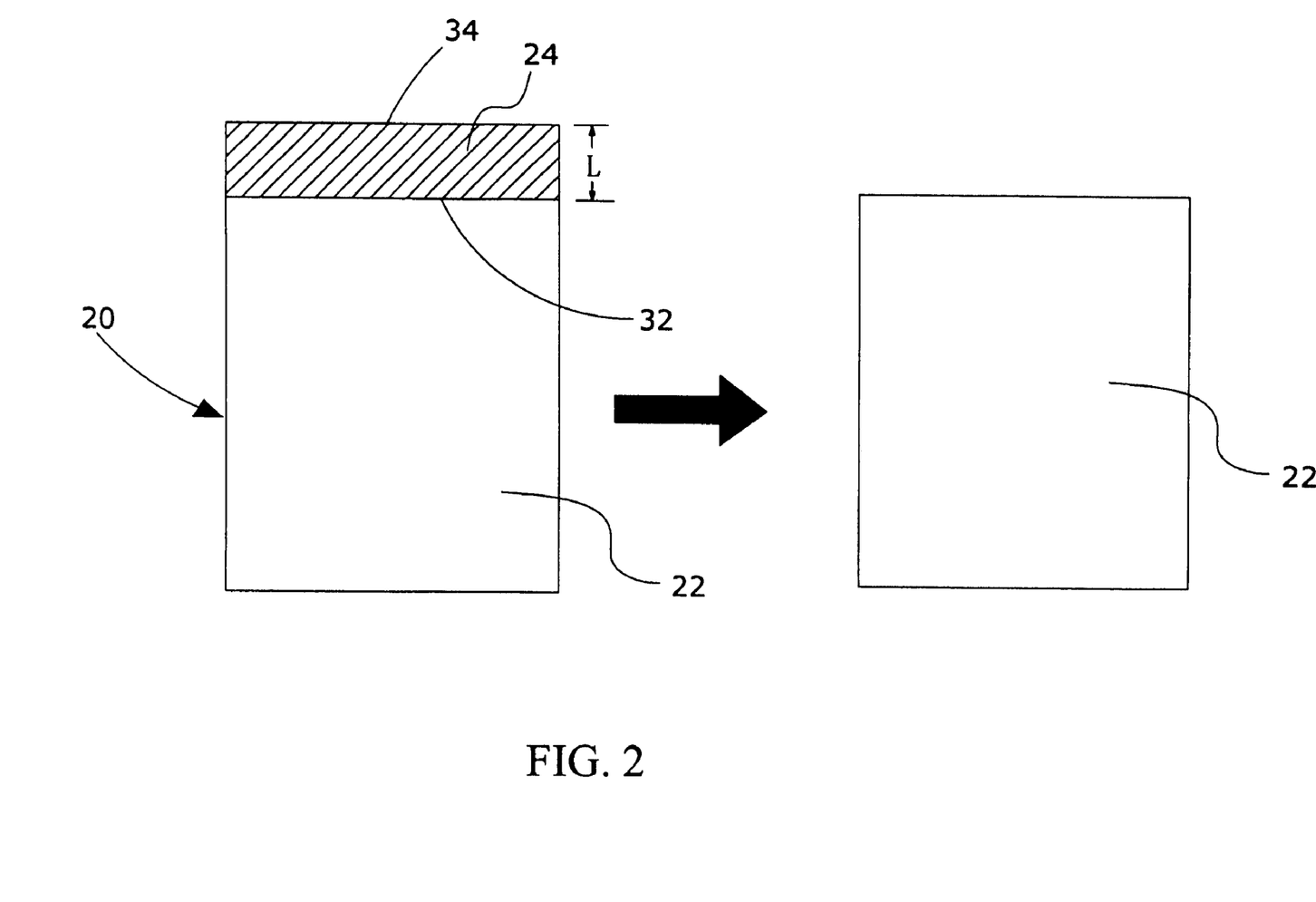
FIG. 2 is a schematic illustration showing a scanned image according to the invention.

As shown in FIG. 2, according to the scanning condition mentioned hereinabove, a scanned image 20 acquired by the scanning module includes an area image generated corresponding to the background reference, and an area image generated corresponding to the sheet. Because the image of the background reference does not pertain to the actually required image, the area image generated corresponding to the background reference is defined as an ineffective area 24 while the area image generated corresponding to the sheet is defined as an effective area 22. In this case, the effective area corresponds to an area image generated according to a whole area of a sheet. The ineffective area 24 is located in front of the effective area 22 and may be referred as a leading edge error.

A typical image reading apparatus may have the function of recognizing the effective area 22 and the ineffective area 24. In this present invention, the image reading apparatus has to first obtain the distance between a front boundary 32 of the effective area 22 and a front boundary 34 of the ineffective area 24. The distance may be obtained by calculating the number of pixels covered in this range. The method of calculating the number of pixels pertains to the prior art. For example, an image processing program or an application specific integrated circuit (ASIC) can be used to calculate the number of pixels.

Conventionally, when the sheet is transported from the paper tray to the position corresponding to the scanning module, the movement of the sheet is controlled by the feeding roller and the number of the rotations of the feeding roller determines the travel distance of the sheet. When the feeding roller rotates by a predetermined number of rotations, the scanning module starts to acquire the image. The invention reduces the ineffective area 24 by adjusting the number of rotations of the feeding roller and the timing for the scanning module to start scanning.

As shown in FIG. 2, when the scanning module performs an early scan or performs a large area scan, the scanning module acquires the scanned image containing the effective area 22 and the ineffective area 24. If the ineffective area 24 has a length of L, it means that the scanning module should, instead, start to scan after the sheet is moved by the distance L or after the sheet is moved farther by the distance L, dependent on the timing for the scanning module to start scanning, so as to acquire a scanned image which includes only the image of the effective area 22. Hence, by adjusting the number of rotations of the feeding roller for transporting the sheet to the position corresponding to the scanning module and the timing for the scanning module to start scanning, the invention can achieve the goal of precisely reproducing the image of the sheet.

However, in practice, a scanned image may also be accepted if a small area of the ineffective area 24 exists. So, a parameter P may be assigned when the invention is utilized, and the parameter P may be added to the learning procedure.

Figure 3:
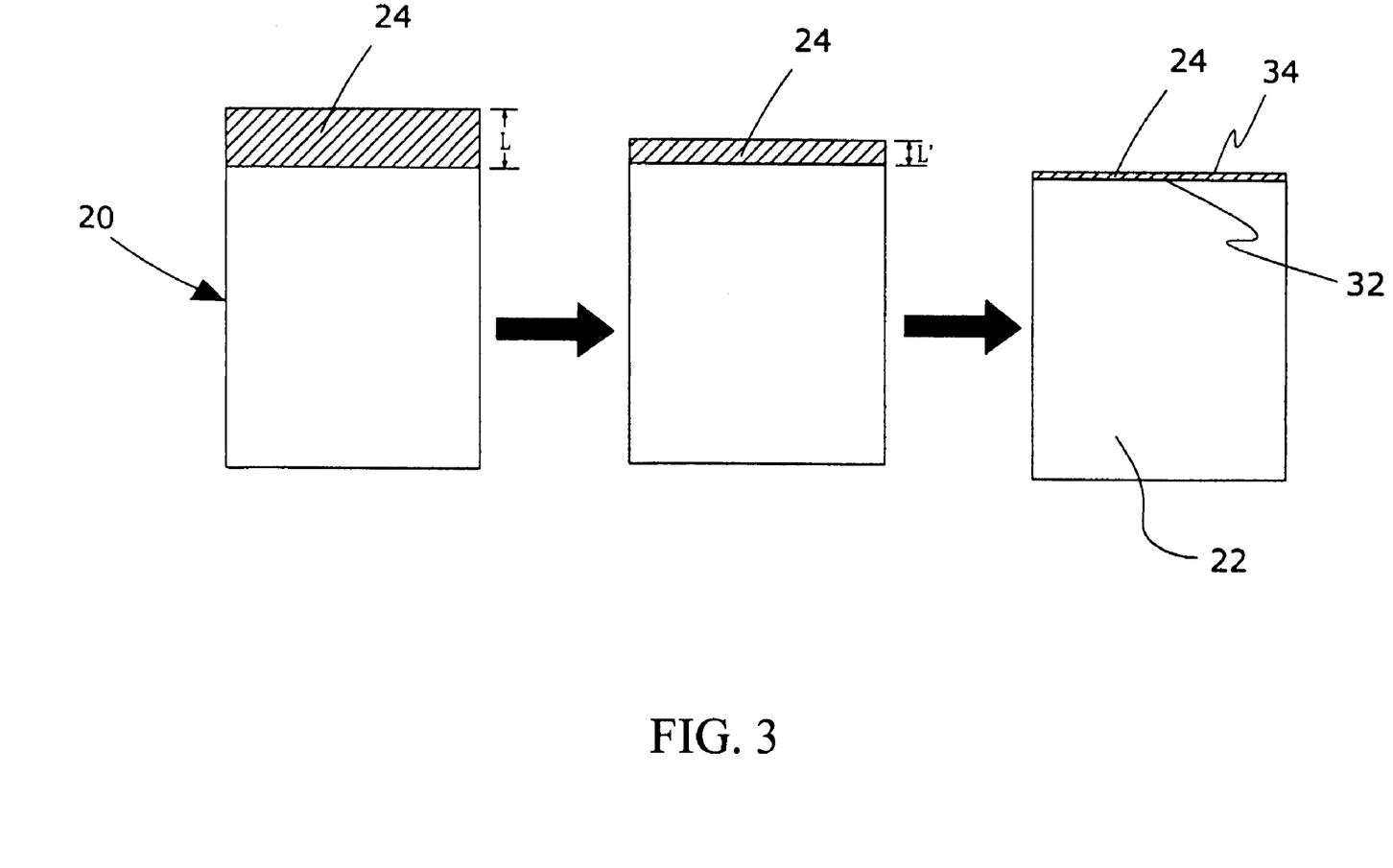
FIG. 3 is a schematic illustration showing a method of acquiring an image by way of approximation according to the present invention.

As shown in FIG. 3, if a first sheet is scanned early or a large area of the first sheet is scanned, the scanned image 20 contains the ineffective area 24 having the length L, which may correspond to the distance traveled by the sheet when the feeding roller rotates by five revolutions. After the parameter P is applied, the feeding roller is controlled to rotate by 4.9 revolutions such that a second sheet is moved by a distance smaller than L, and another ineffective area 24 with the length L' is generated in the scanned image 20. The distance traveled by the sheet and the revolutions of the feeding roller is again adjusted by checking the new ineffective area 24 in conjunction with the parameter P, and the image of the next sheet is scanned until the size of the ineffective area 24 of the scanned image is equal to or smaller than a typically allowed value. In other words, the ineffective area 24 is gradually reduced by way of approximation so that the front boundary 34 of the ineffective area 24 is closer to the front boundary 32 of the effective area 22.

Figure 4:
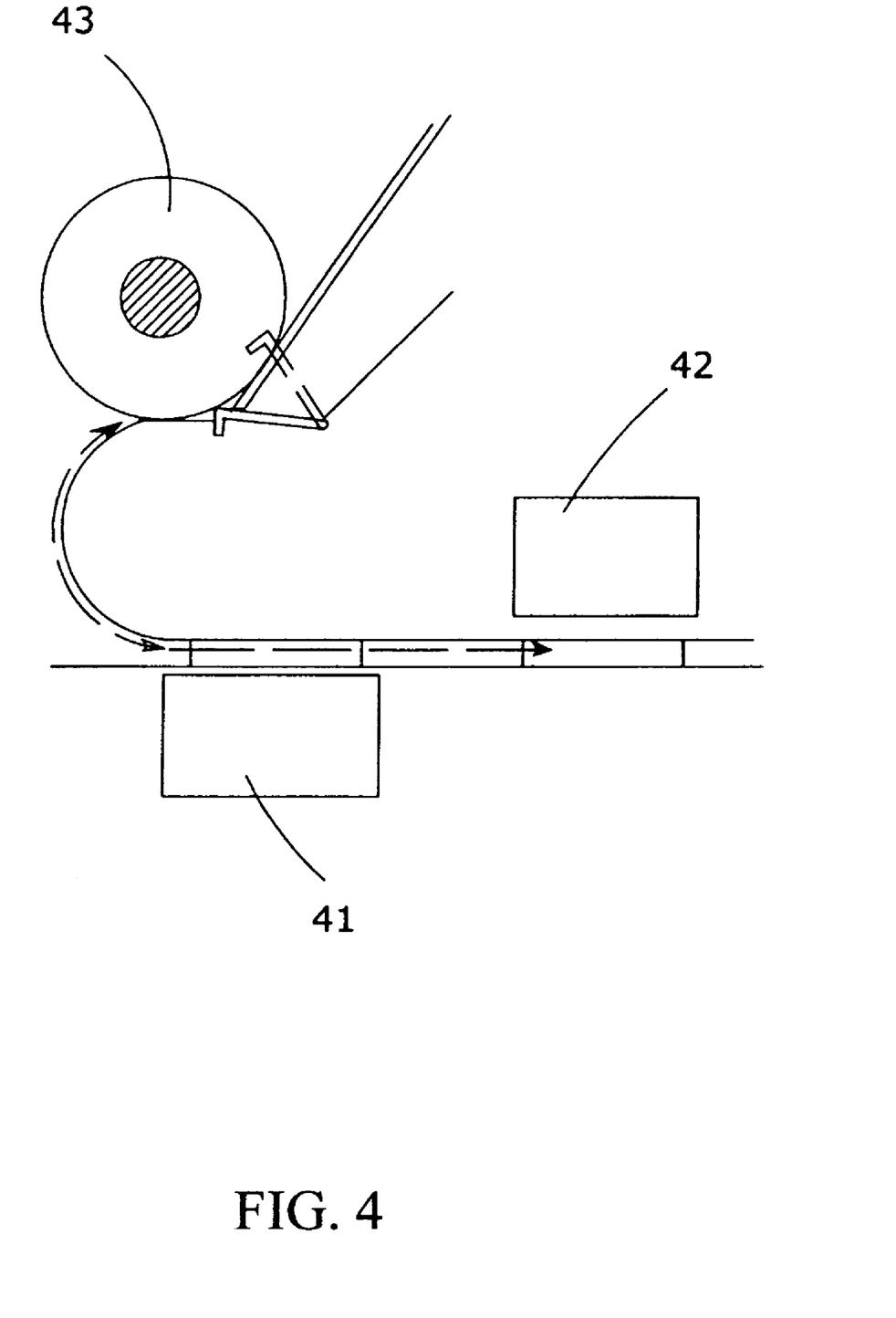
FIG. 4 is a schematic illustration showing a structure of an image reading apparatus having two scanning modules.

As shown in FIG. 4, the image reading apparatus capable of performing the duplex scan has two scanning modules, such as a first scanning module 41 and a second scanning module 42, disposed in a staggered manner. Since the respective distances traveled by the sheet to the scanning modules 41 and 42 are different from each other, as indicated by the dashed line arrows, the images acquired by the scanning modules 41 and 42 have problems concerning not only the positions of front boundaries but also the difference in leading edge errors in the scanned images acquired by the scanning modules 41 and 42.

To solve the problem concerning the front boundaries of the effective area and the ineffective area in the scanned images for the duplex image reading apparatus, the method of the invention comprises the step of adjusting the timing for starting scanning according to the length of the shorter ineffective area or the average of the lengths of the two ineffective areas. Or alternatively, the leading edge errors occurred to the two scanned image may be respectively corrected according to respective ineffective area.

Figure 5:
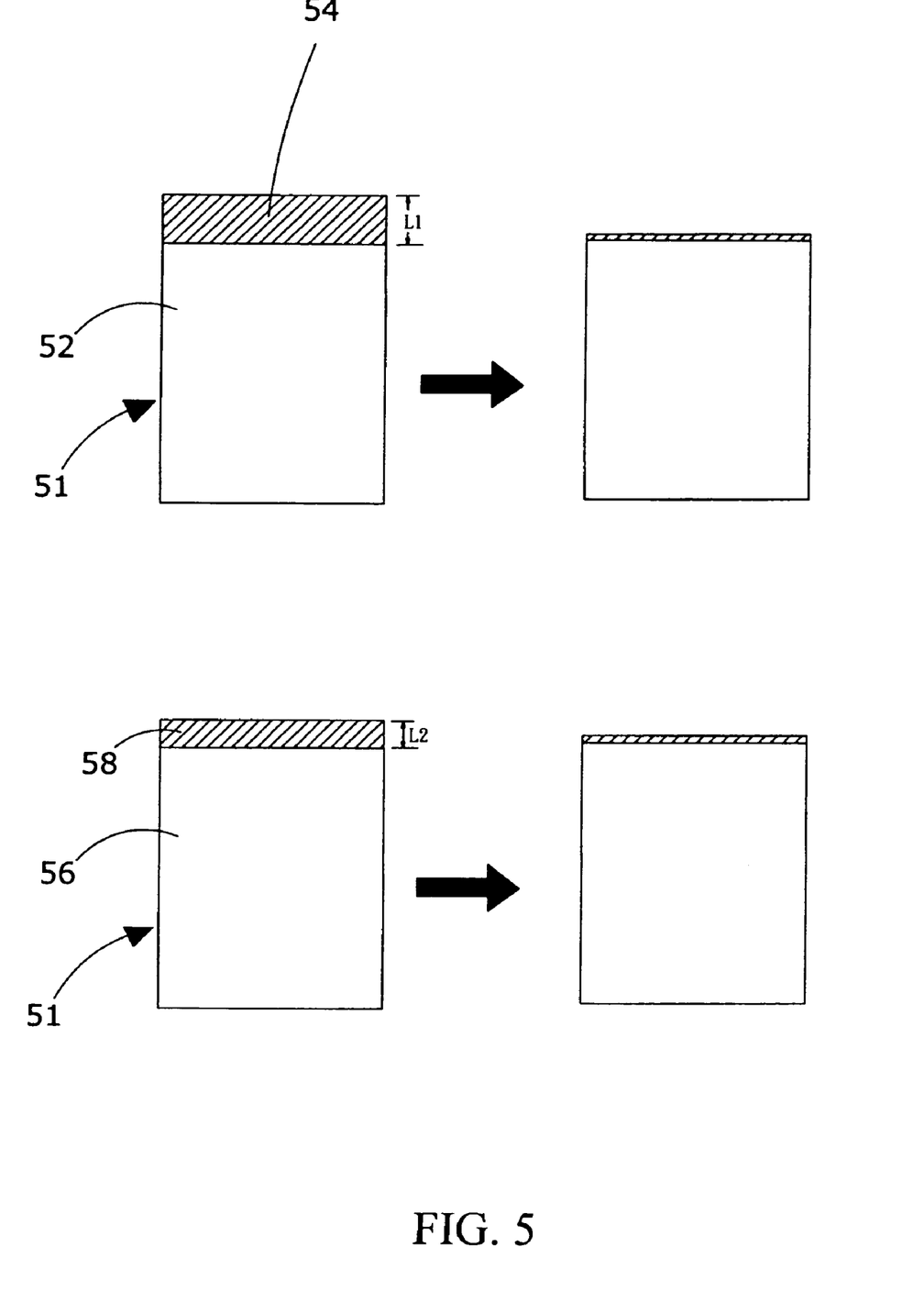
FIG. 5 is a schematic illustration showing images generated by the image reading apparatus having the two scanning modules.

As shown in FIGS. 4 and 5, an image 51 acquired by the first scanning module 41 includes an effective area 52 and an ineffective area 54. An image 55 acquired by the second scanning module 42 includes an effective area 56 and an ineffective area 58. The number of rotations of the feeding roller 43 for moving the sheet to the first scanning module 41 is adjusted according to the length L1 of the ineffective area 54. Similarly, the number of rotations of the feeding roller 43 for moving the sheet to the second scanning module 42 is adjusted according to the length L2. Thus, when the feeding roller 43 is rotated by the adjusted number of rotations in the subsequent sheet-feeding and scanning process, the first scanning module 41 and the second scanning module 42 start to acquire the images. Thus, the leading edge errors of the images acquired by the first scanning module 41 and the second scanning module 42 may be smaller than or equal to the typically allowed error, or even equal to zero.

The method of determining the effective area and the ineffective area according to different gray or color levels of the image may further be utilized to judge an area image pertaining to the graphics/text area. In this case, the effective area corresponds to an area image generated according to the graphics/text area of the sheet, and the ineffective area corresponds to an area image generated according to an area outside the graphics/text area of the sheet.

Figure 6:
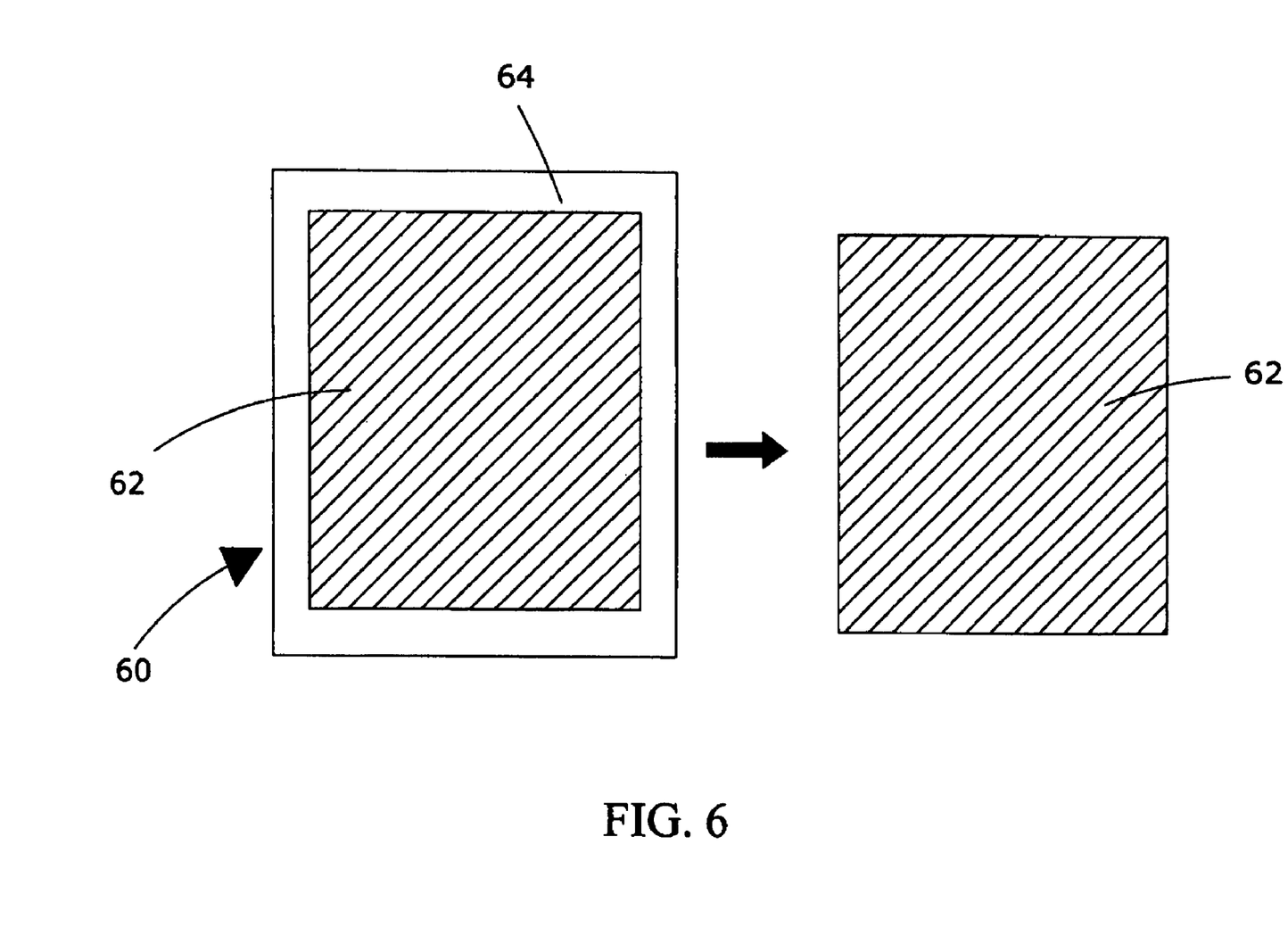
FIG. 6 is a schematic illustration showing the method of the present invention of processing a graphics/text area and its peripheral blank area.

As shown in FIG. 6, when a scanned image 60 contains a graphics/text area 62 and a blank area 64, the graphics/text area 62 is defined as the effective area while the blank area 64 is defined as the ineffective area. The learning procedure is applied to the sheet-feeding operation according to the above-mentioned technology in order to adjust the traveling distance of the sheet to the scan-start position and to adjust the timing for starting scanning. Thus, the blank area 64 in front of the graphics/text area 62 can be removed. Then, the blank area 64 around the graphics/text area 62 may be to edit out in post image processing, so that the acquired image fully pertains to the effective area.

Figure 7:
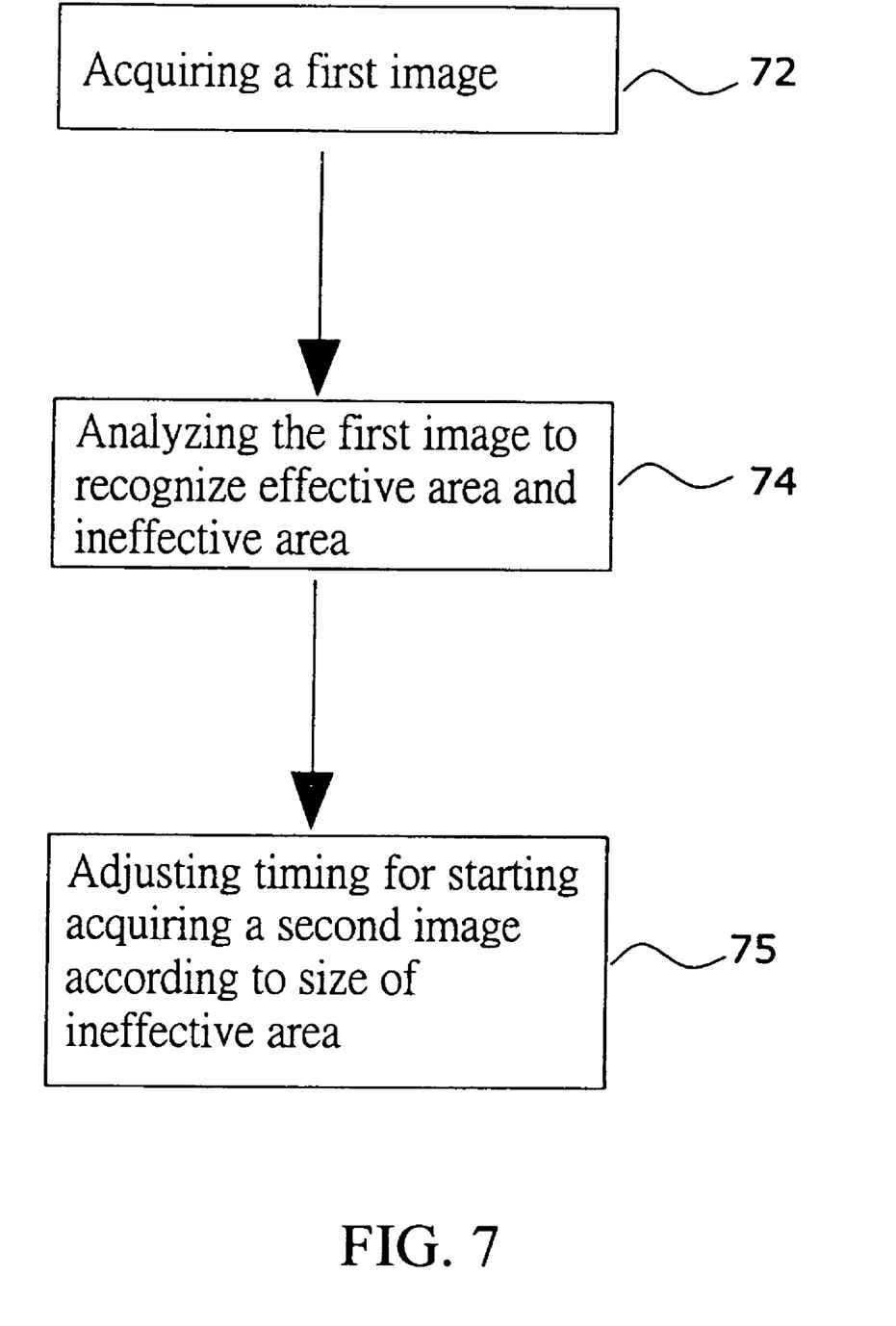
FIG. 7 is a flow chart showing the method of the present invention.

As shown in FIG. 7, the invention can be concluded as including the following steps according to the above-mentioned description.

(a) In step 72, acquiring a first image. In detail, the first image is acquired at a scan region by performing a sheet-feeding operation and an image scanning operation of the scanning apparatus. In this embodiment, the first image may correspond to an area image generated according to a large area scan by the image reading apparatus. In the step 72, a sub-step of starting acquiring the first image before a leading edge of the sheet reaches the scan region of the image reading apparatus may be include.

(b) In step 74, analyzing the first image to recognize an effective area and an ineffective area outside the effective area.

(c) In step 75, adjusts the timing for starting acquiring a second image in relation to size of the ineffective area, so as to reduce the size of the ineffective area in the second image. In the step 75, the sub-steps of adjusting a traveling distance of the sheet before the sheet is scanned, and adjusting timing for the scanning module of the image reading apparatus to start scanning may be included.

In addition, each image acquired may be transmitted to be post-processed to have the ineffective area edited out, or may be printed directly. When the scanned image 60 is judged as containing the blank area 64 in the step 74, in the next step 75, the timing for starting acquiring the second image can be adjusted to reduce the blank area 64. Thus, when the second image is acquired, the front boundary of the ineffective area in the second image may further approach the front boundary of the effective area. Furthermore, repeating the above-mentioned steps can make the boundary approach zero theoretically.

In detail, the method of adjusting the ineffective area may be performed by converting the number of pixels along the length of the ineffective area in the first image into the number of rotations of the feeding roller. Another sheet placed in the paper tray is moved forwards according to the number of rotations, and then the scanning module starts scanning the sheet to acquire the second image. In this case, the post image/second image may still contain the ineffective area, so the second image, like the first image, serves as the reference for adjusting the ineffective area. Next, still another sheet placed in the paper tray is further transported and scanned to acquire an image serving as the reference for adjusting the ineffective area. The size of the ineffective area is repeatedly reduce until the ineffective area approaches zero or becomes smaller than/equal to the allowed value of the ineffective area in an image.

The method of the invention may be performed when the surface wear of the feeding roller is found to cause the errors in the sheet feeding operation. When the steps of the method of invention are carried out, the scanned image of the documents place in the paper tray can serve as the reference for regulating the number of the rotations of the feeding roller for moving the sheet to the position corresponding to the scanning module, and the reference for adjusting the timing for the scanning module to start scanning. It is also possible to prepare several standard sheets to calibrate the number of the rotations of the sheet-feeding roller for moving the sheet to the position opposite the scanning module, and to calibrate the timing for starting scanning in the sheet-feeding operation and the image scanning operation. In addition, the method of the invention may be performed every time or every day before the scanning process is performed. Furthermore, although the sheet-feeding mechanism comprises at least one roller in the above-mentioned embodiment, the sheet-feeding mechanism may also comprises a caterpillar set.

When the scanning module has reduced the ineffective area/leading edge error generated by the sheet-feeding operation and the image scanning operation, a document may be scanned according to the normal sheet-feeding operation and the image scanning operation.

As mentioned hereinabove, the invention provides the area image acquiring method for the image reading apparatus having the sheet-feeding mechanism for feeding the sheet to be scanned. The method includes the steps of: performing the sheet-feeding operation and the image reading operation to acquire the first image; performing the leading edge recognizing procedure to recognize the leading edge error of the first image corresponding to the sheet; and performing the leading edge error decreasing procedure according to the leading edge error in the first image to regulate the number of the rotations the sheet-feeding mechanism executes for transporting another sheet to the position opposite the first scanning module, and thus to acquire a second image having a smaller leading edge error than the leading edge error in the first image.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. An area image acquiring method for an image reading apparatus having an automatic sheet-feeding function, the method comprising the steps of:
   acquiring a first image at a scan region of the image reading apparatus by performing a sheet-feeding operation and an image reading operation;
   analyzing the first image to recognize an effective area and an ineffective area outside the effective area; and
   adjusting a timing for starting acquiring a second image in relation to size of the ineffective area, so as to reduce the size of the ineffective area in the second image.

2. The method according to claim 1, wherein the effective area and the ineffective area have different gray or color levels.

3. The method according to claim 1, wherein the effective area corresponds to an area image generated according to a whole area of a sheet.

4. The method according to claim 1, wherein the effective area corresponds to an area image generated according to a graphics/text area of a sheet.

5. The method according to claim 1, wherein the ineffective area corresponds to an area image generated according to an area of a backing part which provides background reference to a sheet.

6. The method according to claim 1, wherein the ineffective area corresponds to an area image generated according to an area outside a graphics/text area of a sheet.

7. The method according to claim 1, wherein the first image corresponds to an area image generated according to a large area scan by the image reading apparatus.

8. The method according to claim 1, wherein the step of acquiring the first image comprising the step of:
   starting acquiring the first image before a leading edge of a sheet reaches the scan region of the image reading apparatus.

9. The method according to claim 1, wherein the step of adjusting timing for starting acquiring the second image comprises the step of:
   adjusting a traveling distance of a sheet before the sheet is scanned, and adjusting a timing for a scanning module of the image reading apparatus to start scanning.

10. The method according to claim 1, wherein a length of the ineffective area is calculated according to a number of pixels.

11. The method according to claim 1, further comprising the step of:

editing the ineffective area out from the second image by post image processing.

12. An area image acquiring method for an image reading apparatus having a sheet-feeding mechanism for feeding a sheet to be scanned, and the image reading apparatus comprises a first scanning module, the method comprising the steps of:

performing a sheet-feeding operation and an image reading operation to acquire a first image;

performing a leading edge recognizing procedure to recognize a leading edge error of the first image corresponding to the sheet; and performing a leading edge error decreasing procedure according to the leading edge error in the first image to regulate a number of rotations the sheet-feeding mechanism executes for transporting another sheet to a position opposite the first scanning module, and thus to acquire a second image having a smaller leading edge error than the leading edge error in the first image.

13. The method according to claim 12, wherein the image reading procedure comprises the step of repeating the above-mentioned steps until a leading edge error in a subsequent image is not greater than a predetermined leading edge error.

14. The method according to claim 12, wherein the image reading procedure comprises the step of starting acquiring the first image before a leading edge of the sheet reaches the position opposite the first scanning module.

15. The method according to claim 12, wherein the leading edge error is recognized by recognizing a difference in color levels between a background reference and the sheet.

16. The method according to claim 12, wherein the image reading apparatus further comprises a second scanning module so that a duplex scan can be performed.

17. The method according to claim 12, wherein the sheet-feeding mechanism comprises at least one roller for transporting the sheets.

18. The method according to claim 12, wherein the sheet-feeding mechanism comprises a caterpillar set for transporting the sheets.

* * * * *